Jan. 7, 1936.  F. GEIGER  2,026,881
CHART DISPLAY APPARATUS
Filed June 18, 1932 — 6 Sheets-Sheet 1
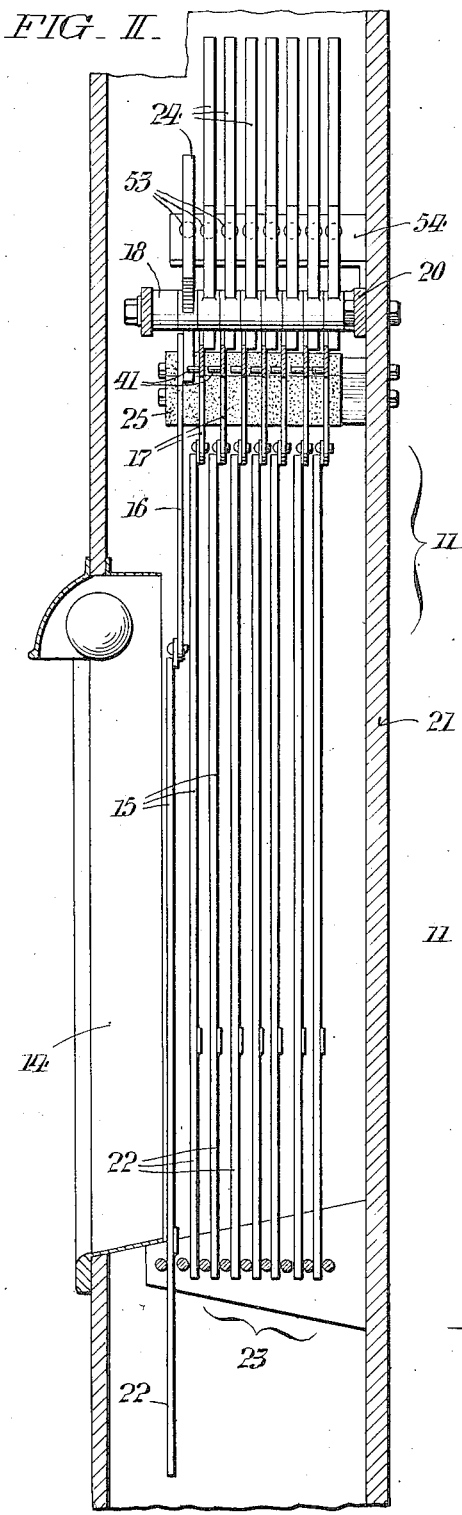
FIG. II.
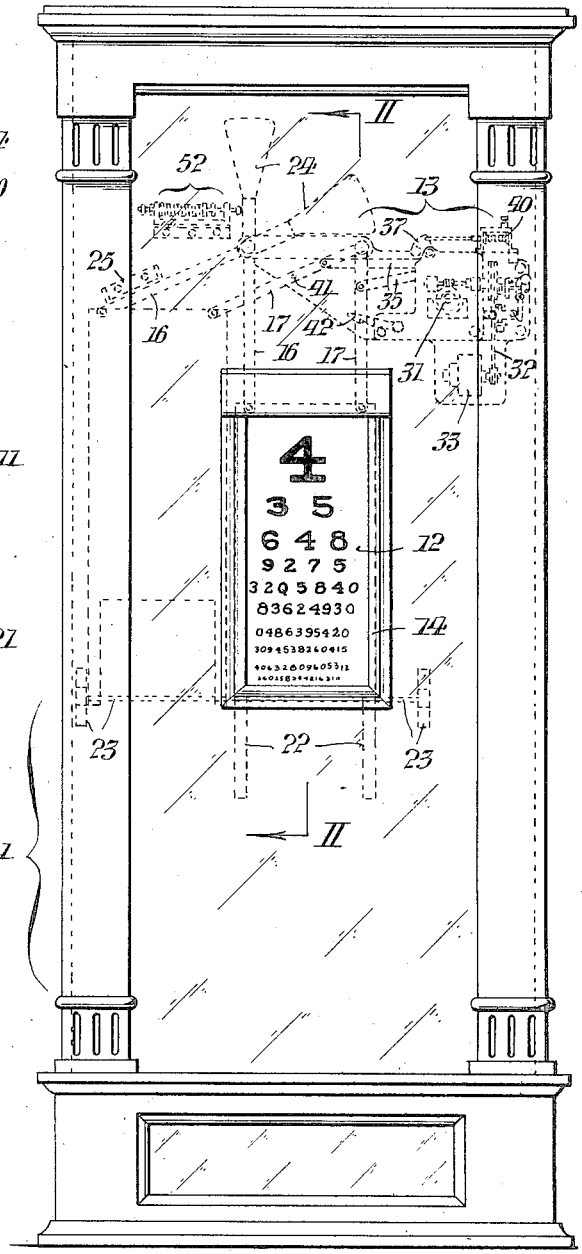
FIG. I.
INVENTOR:
Frederick Geiger,
BY Harry R. Paul
ATTORNEYS.

Jan. 7, 1936. F. GEIGER 2,026,881
CHART DISPLAY APPARATUS
Filed June 18, 1932 6 Sheets-Sheet 2
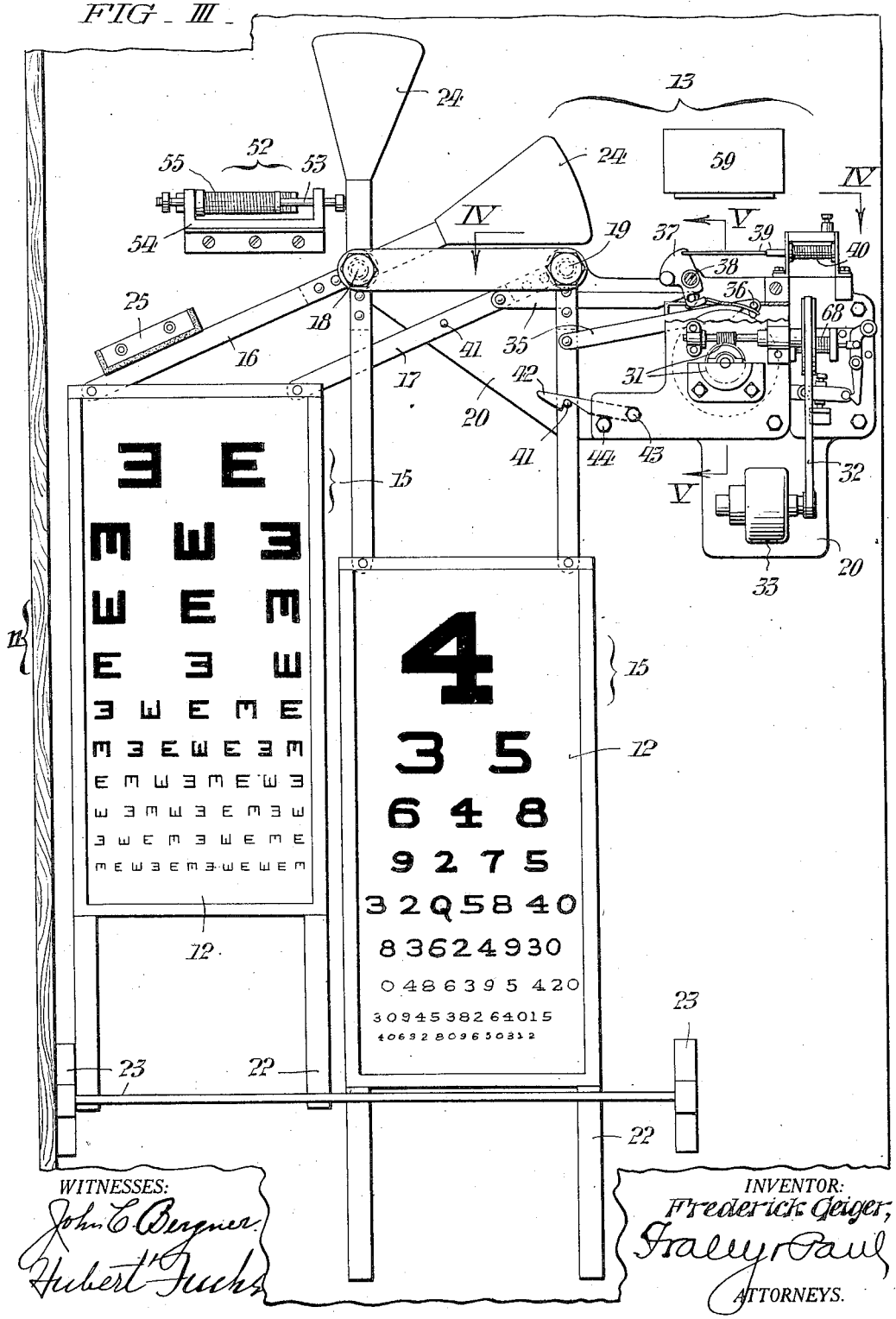

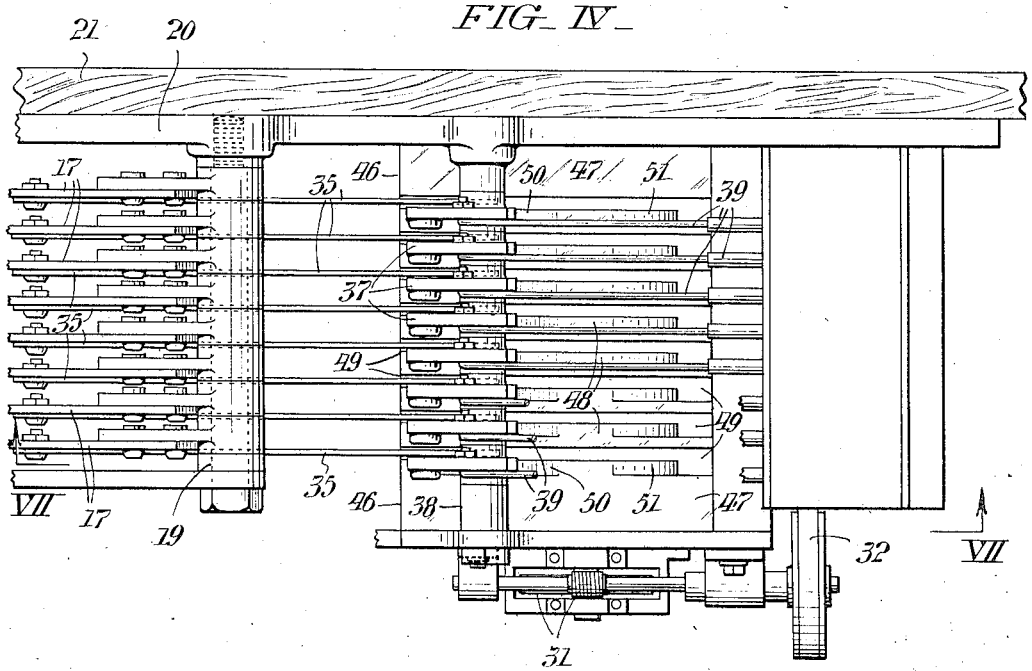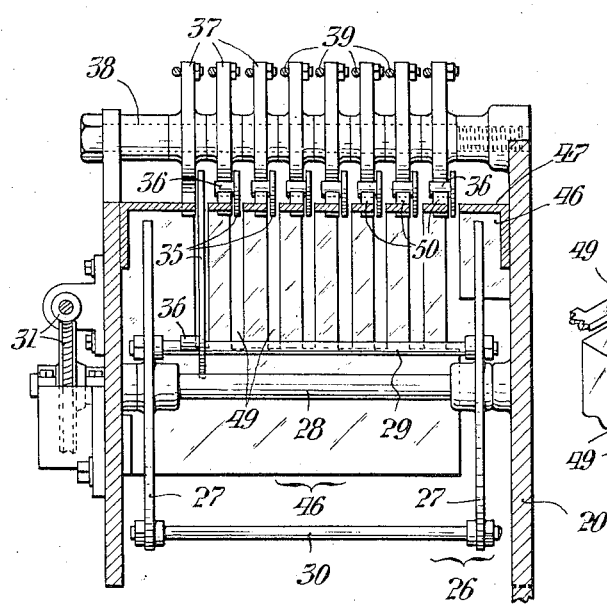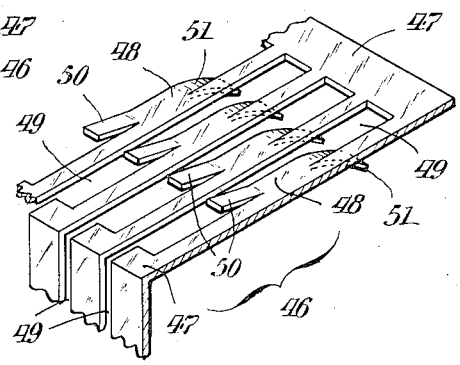

Jan. 7, 1936.  F. GEIGER  2,026,881
CHART DISPLAY APPARATUS
Filed June 18, 1932   6 Sheets-Sheet 4
FIG. VII
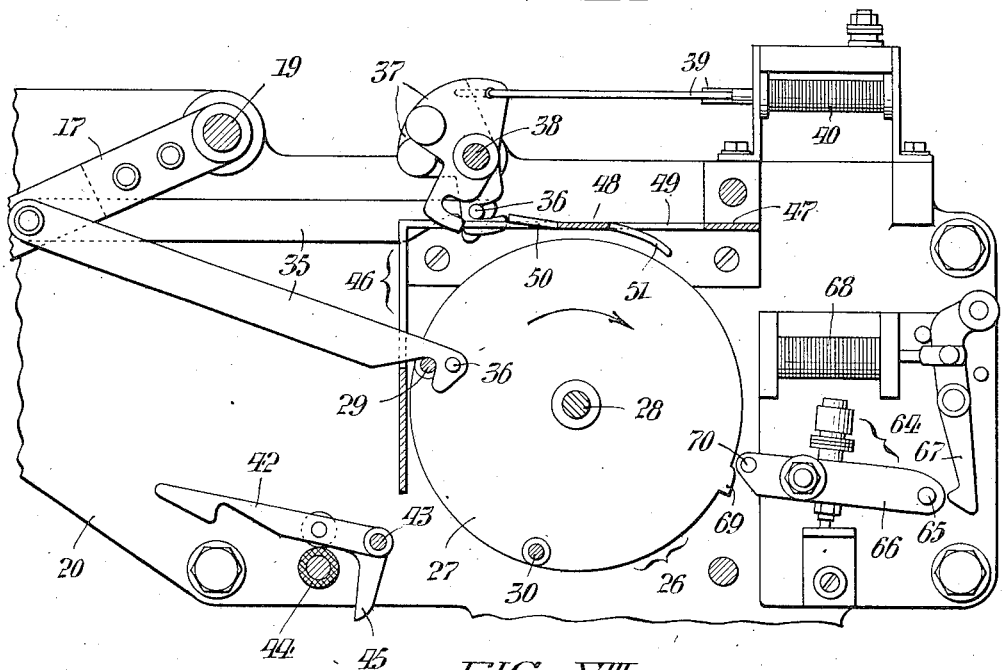
FIG. VIII
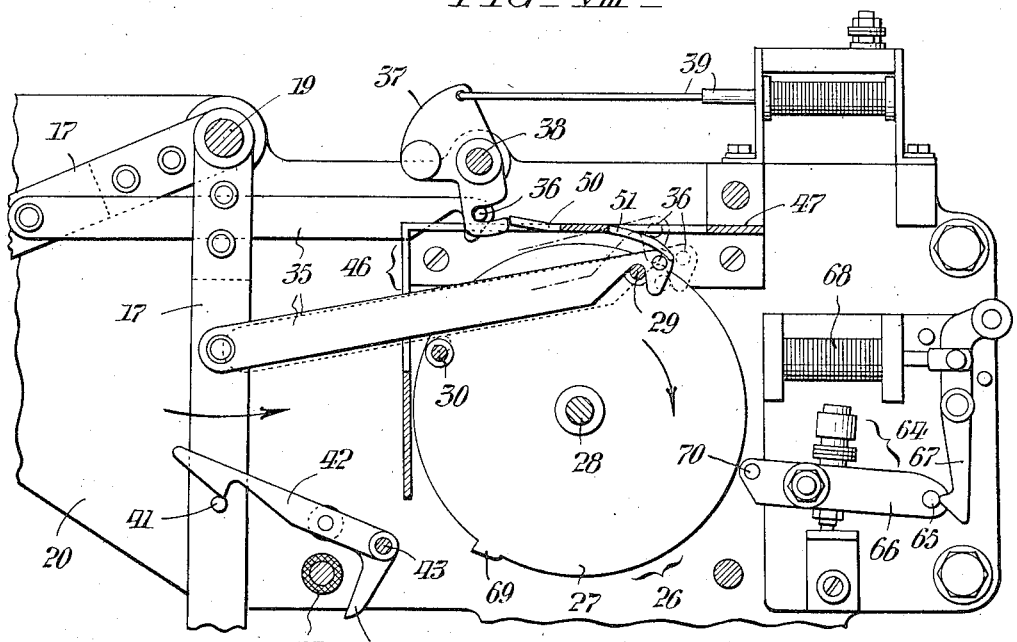
WITNESSES:
John E. Bergner
Hubert Fuchs
INVENTOR:
Frederick Geiger,
BY Bally Paul
ATTORNEYS.

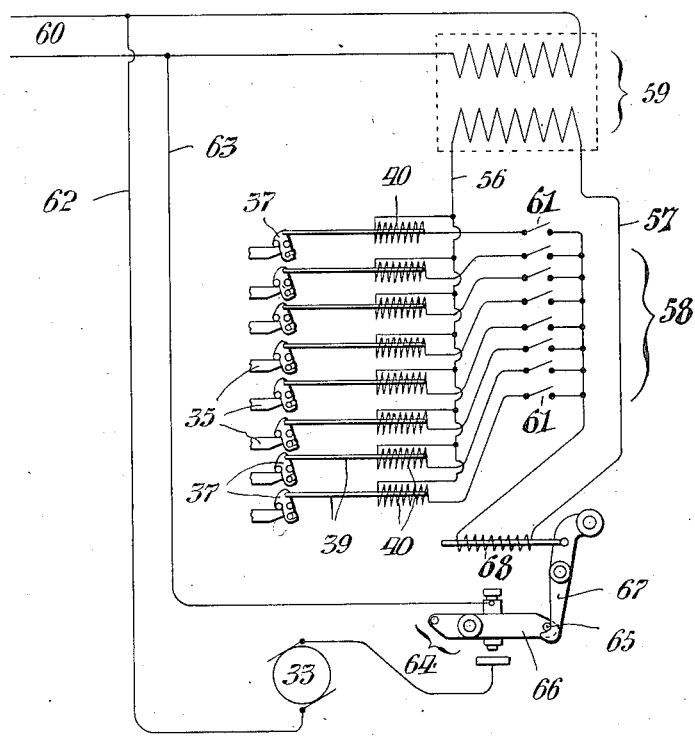

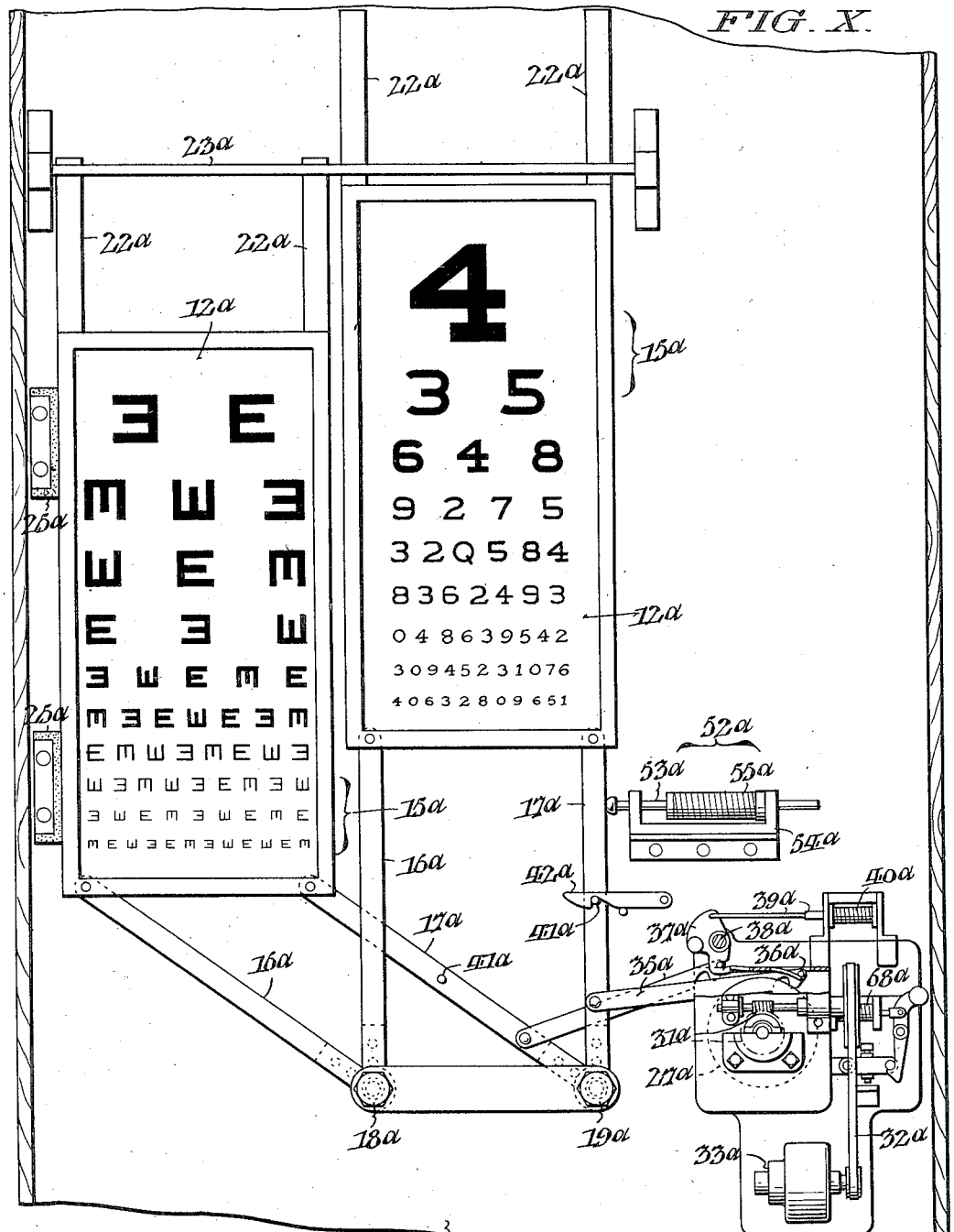

Patented Jan. 7, 1936

2,026,881

UNITED STATES PATENT OFFICE 2,026,881

CHART DISPLAY APPARATUS

Frederick Geiger, Drexel Hill, Pa., assignor to Wall & Ochs, Philadelphia, Pa., a corporation of Pennsylvania Application June 18, 1932, Serial No. 618,015

10 Claims. (Cl. 40—52)

This invention relates to apparatus useful, for example, to occulists in displaying reading charts incident to testing the eye sight of patients for distance, and it constitutes an improvement over an apparatus for a like purpose disclosed in a copending patent application Serial No. 588,256 filed by me on January 23, 1932.

The apparatus of my previous application comprises a series of pivoted counter-weighted charts which were moved, with concurrent release of previously displayed charts, from a normal position of concealment to display position at an opening in a housing cabinet, by direct action of respectively associated operating solenoids selectively controlled by individual push buttons convenient of access to the occulist making the vision test. Due to the instantaneous action of the solenoids, the motion imparted to the charts was sudden and violent, and accordingly attended by noises and excessive shocks to the parts.

Broadly speaking, my present invention is directed toward overcoming the above indicated drawbacks; which desideratum I attain, as hereinafter fully explained, through provision of power actuating means which is simple and compact in construction, and gentle though positive in its action in moving the charts into display position without creation of objectionable noises and without impartation of shocks such as would be likely to cause injury to, or derangement of, the parts.

Other objects and attendant advantages of this invention will be manifest from the following detailed description taken in connection with the attached drawings, wherein Fig. I is an illustration showing my improved chart display apparatus in front elevation.

Fig. II is a fragmentary view to a larger scale showing a vertical section taken as indicated by the arrows II—II in Fig. I.

Fig. III is a fragmentary elevation of the apparatus with the front panel of the housing cabinet removed.

Fig. IV is a fragmentary illustration in plan of the chart actuating mechanism viewed as indicated by the arrows IV—IV in Fig. III.

Fig. V is a cross sectional view of the actuating mechanism taken as indicated by the arrows V—V in Fig. III.

Fig. VI is a fragmentary detail perspective view of a part embodied in the actuating mechanism.

Fig. VII is a sectional view of the actuating mechanism taken as indicated by the arrows VII—VII in Fig. IV.

Fig. VIII is a view like Fig. VII showing the parts differently positioned.

Fig. IX is a diagrammatic view showing the wiring connections of the electric control means for the chart actuating mechanism; and, Fig. X is a view similar to Fig. III showing a modified embodiment of my invention.

The chart display apparatus herein illustrated, it will be observed, is generally similar to that of my previous application supra in that it comprises a vertical wall housing cabinet 11 which encloses a multiplicity of charts 12 (in this instance eight of them) together with actuating mechanism 13 for selectively moving the charts 12 from a normal position of concealment at one side of the cabinet 11 to a display opening 14 at the front of said cabinet. Also as before, the holders 15 for the charts 12 are pivotally suspended from the ends of parallel arms 16 and 17 whereof the respective groups are fulcrumed on axes 18, 19 which are fixed in a supporting plate 20 secured to the back wall 21 of the housing cabinet 11. Incident to movement of the charts 12 as just explained, their holders 15 are maintained in definite separation against interfering with each other through engagement of depending extensions 22 on them with individual parallel slots of a horizontal guide 23. The counterweights 24 on the arms 16 are influential in returning the charts 12 to the normal position of concealment in which position the said arms engage a fixed stop 25 which is covered with felt or other suitable shock and noise absorbing padding.

The actuating mechanism 13 of my present invention includes a rotor 26 which is carried by the supporting plate 20 and which consists of a pair of disks 27 in spaced relation on a shaft 28, said disks being connected adjacent their peripheries by two transverse rods 29 and 30 spaced by a quadrant. The rotor 26 is arranged to be driven, through interposed speed reduction instrumentalities including a worm gear couple 31 and a belt connection 32 from an electric motor 33 also carried by the supporting plate 20, and during each actuation is confined to a single rotation by means later on described. Pivotally connected to the supporting arms 17 of the individual chart holders 15 are gravity hook members 35 which are normally held in elevated position above the drum 26 through individual engagement of lateral studs 36 on their outer ends by counterweighted hook-like keepers 37. These keepers 37 are mounted in common but with capacity for independent movement, on a fixed fulcrum axis 38, and separately coupled with the armatures 39 of actuating solenoids 40, see Figs. IV, VII and VIII. Upon operation of any one of the keepers 37 by its solenoid 40, the corresponding hook member 35 is released to drop by gravity as shown in Fig. VII, into engagement with the transverse rod 29 of the drum 26 so that during clockwise rotation of the latter, the particular chart holder 15 with which such hook member is associated, is swung downward and rightward from its position of concealment into registry with the display opening 14 at the front of the housing cabinet 11. As the operated chart holder 15 approaches the end of its downward movement, a lateral stud 41 on its arm 17 automatically engages with a hook gravity latch finger forming one of a series 42 for the respective charts, the group being pivoted for movement enmasse about a fixed axis 43. Normally, the latch fingers 42 rest on a fixed rubber sheathed stop 44 which also serves, by cooperation with a tail 45 on said fingers to limit the swinging movement of the latter. By lifting of the latch members 42 in the manner just described, the holder 15 of a chart 12 previously displayed is automatically released for return to its normal position of concealment in the cabinet 11 under the action of the counterweight 24 on its support arm 16.

For maintenance of the hook members 35 in definitely spaced relation laterally, I have provided a slotted angular grid 46 whereof the horizontal plate or portion 47 overlies the rotor 26. As shown in Figs. IV–VIII, the horizontal plate 47 of the grid 46 affords cam skids 48 which respectively lie along the guide slots 49 at one side and have their opposite tongue ends 50 and 51 sloped upwardly and downwardly respectively. Referring again to Fig. VIII, it will be noted that as the rotor 26 turns, its transverse rod 30 ultimately engages the released hook member 35 from beneath and lifts it gradually, whereby the stud 36 on said hook member is brought beyond and above the cam tongue 51 of the skid 48 in the corresponding slot 49 of the grid 46 as shown in dotted lines. Instantly upon disengagement of the hook end of the hook member 35 from the transverse rod 29 of the rotor 26, the chart holder 15 which has just been brought into display position is temporarily released to the action of the counterweight 24 on its supporting arm 16, and is accordingly retracted slightly until the stud 41 of said supporting arm engages the stop edge of the corresponding latch finger of the group 42. With the same movement, the hook member 35 of the newly displayed chart 12 is pulled rearward or toward the left slightly in Fig. VIII with its stud 36 now resting on the tongue 51 of the skid 48 as shown in dot-and-dash lines. After these several things have been accomplished, the rotor 26 continues in motion for a time until it has completed a single revolution, at the end of which its transverse bars 29 and 30 arrive at the positions shown in Fig. VII. Upon the next actuation of the mechanism 13 for a new substitution of charts 12, the stud 36 of the hook member 35, as the latter is pulled forward or leftward from the dot-and-dash line position shown in Fig. VIII, slides along the skid 48, and is finally guided by the upturned cam end 50 of said skid into the hook of the corresponding keeper 37.

For the purpose of initiating the return movement of the charts 12 upon release at the display position, I have provided what may be termed a "kick-off" means which is generally indicated at 52 in Figs. I and III. As shown this kick-off means 52 comprises a series of spring-pressed plungers 53 which are slidably supported in a bracket 54 secured to the back wall 21 of the cabinet housing 11, and arranged to coact individually with the counterweighted chart holder supporting arms 16. During the latter part of the movement of a chart holder 15 to active position, the spring 55 of the corresponding plunger 53 is compressed as shown in Fig. III in readiness for kick-off action upon the counterweighted arm 16 of such chart holder when the latter is subsequently released. The inertia of the counterweight 24 at the beginning of the chart return movement is thus effectively overcome with assurance of instant release of the chart holder 15 by the corresponding latch member 42 concurrently with placement of a new chart holder 15 in display position as above explained.

Referring now to Fig. IX, the solenoids 40 for actuating the keepers 37 are connected in parallel across the conductors 56, 57 of a circuit 58 which receives electric current at a suitably reduced voltage, through a transformer conventionally indicated at 59, from a power line 60, said solenoids being separately controllable by chart selecting push buttons 61 which may be located, for example, at the desk of the oculist making the sight test. The motor 33 receives current directly from the power line 60 through connecting conductors 62 and 63, and is governed by a relay switch 64. As shown in Figs. III and IX, this relay switch 64 is normally held open due to engagement of a stud 65 on its swinging contact finger 66 by a pivoted trip latch 67 arranged to be operated by a solenoid 68 interposed in the same circuit 58 with the solenoids 40. Obviously, with this arrangement, the pushing of any one of the buttons 61 is attended by energization of the coordinated solenoid 40 as well as of the solenoid 68 with resultant actuation of the keeper 37 corresponding to such solenoid 40 and closing of the motor switch 64 to initiate an operative cycle of the mechanism 13 for interchange of charts 12 in the manner already understood. The motor switch 64 remains closed until a circumferential lug 69 on one of the disks 27 of the rotor 26 engages a stud 70 on the contact finger 66 of said switch to open the latter. The rotor 26 is thus confined to a single revolution during each operative cycle of the mechanism 12.

In the modified embodiment of my invention illustrated in Fig. X, the parts of the apparatus are so arranged as to make counterweighting of the chart holders unnecessary. As shown, the parallel chart supporting arms 16a, 17a are pivotally connected to the bottom corner of the chart holders 15a, and fulcrumed on centers 18a, 19a in the lower part of the cabinet 11a instead of in the upper part as in Fig. I. It will be furthermore noted from Fig. X that the actuating mechanism 13a for the charts 12a is identical with that of the first described form of my invention but differently allocated to suit the changed arrangement of the chart supporting arm 16a, 17a. In order, therefore, to preclude the necessity for repetitive description, I have used the same reference numerals previously employed, distinguished in each instance by the suffix a, to identify the component parts of said actuating mechanism. Upon being released by the latch hooks 42a, the charts 15a will be initially impelled by the spring pressed buffers 53a and thereafter fall leftward by gravity from display position to concealed position at one side of the cabinet 11a; and to bring said charts to display position, the drum 27a is in this case relied upon to lift them against the influence of gravity in a manner which will be obvious from Fig. X. The modified arrangement is advantageous in that it lends itself to incorporation in a smaller cabinet than the first described embodiment of my invention, and, moreover, in that that the charts 15a are moved with less shock as a consequence of the absence of counterweights.

From the foregoing, it will be realized that my present invention affords a chart display apparatus which is simple and compact, noiseless in operation, and positive in action incident to interchange of charts under selective control for display purposes. I do not, of course, intend to be limited to the precise details of construction and arrangement illustrated by way of example in the drawings, since this is capable of considerable variation in practice without departure from the spirit of my invention. It is moreover to be understood that my improved apparatus is not necessarily limited to the specific use herein mentioned, but equally adaptable to placard advertising, picture displaying, etc.

Having thus described my invention, I claim:—

1. In chart display apparatus, a housing, a multiplicity of charts with means for yieldingly maintaining them in a normal position of concealment in the housing; and mechanism for moving the charts from the position of concealment for display at an opening in the front of the housing, including a rotor, selector means whereby the charts may be individually connected to the rotor, means for holding the charts in the display position; and means automatically operative as a new chart is brought into display position, to actuate the holding means for release of the previously displayed chart.

2. In chart display apparatus, a housing, a multiplicity of charts with means for yieldingly maintaining them in a normal position of concealment in the housing; and mechanism for moving the charts from the position of concealment for display at an opening in the front of the housing, including a rotor, individual gravity hook members on the charts, individual keepers to normally support the gravity hooks above the rotor, selector means whereby the keepers may be independently actuated to release the hook members for engagement by the rotor, means for automatically re-elevating the gravity hook members to the level of the keepers upon placement of the charts in display position, latch means for holding the charts in display position; and means automatically operative as a new chart is brought into display position, to trip the latch means for release of the previously displayed chart.

3. In chart display apparatus, a housing, a multiplicity of charts with means for yieldingly maintaining them in a normal position of concealment in the housing, and mechanism for moving the charts from the position of concealment for display at an opening in the housing, including a rotor, gravity hook members individually associated with the charts, individual keepers engaging lateral lugs on the hook members to normally support the latter above the rotor, skids at the level of the keepers, selector means enabling individual actuation of the keepers to release the hook members on the respective charts for engagement by the rotor, means automatically operative, after the charts have been brought to display position, to re-elevate the hook members with their lateral lugs resting on the skids aforesaid, latch means for holding the charts in display position; and means automatically operative when a new chart is brought into display position to trip the latch means for release of the previously displayed chart.

4. In chart display apparatus, a housing, a multiplicity of charts with means for yieldingly maintaining them in a normal position of concealment in the housing, and mechanism for moving the charts from the position of concealment for display at an opening in the housing, including a rotor with a pair of circumferentially spaced transverse bars, gravity hook members individually associated with the charts, individual keepers engaging lateral lugs on the hook members to normally support the latter above the rotor, skids at the level of the keepers, selector means enabling individual actuation of the keepers to release the hook members on the respective charts for engagement by one of the transverse bars of the rotor, the other bar of said rotor following in the wake of the first being functional, after the charts have been brought into display position, to re-elevate the hook members with their lateral lugs resting on the skids aforesaid, latch means for holding the charts in display position; and means automatically operative when a new chart is brought into display position to trip the latch means for release of the previously displayed chart.

5. In chart display apparatus, a housing enclosing a multiplicity of charts; and mechanism for moving the charts from a normal position of concealment to display position at an opening in the housing, including a rotor, an electric motor for driving the rotor, selector means whereby the charts may be individually connected to the rotor, a motor control switch automatically operated with the selector means, and means to automatically open the switch after a chart has been brought into display position.

6. In chart display apparatus, a housing enclosing a multiplicity of charts; and mechanism for moving the charts from a normal position of concealment to display position at an opening in the housing, including a rotor, an electric motor for driving the rotor, selector means whereby the charts may be individually connected to the rotor, a motor control switch, means operative to close the switch upon actuation of the selector means, and means operated by the rotor to open the switch after said rotor has completed a single revolution.

7. In chart display apparatus, a housing enclosing a multiplicity of charts; and mechanism for moving the charts from a normal position of concealment to display position at an opening in the housing, including an electric motor, push button controlled electric selector means whereby the charts may be individualy connected to the rotor for impartation of movement thereto as aforesaid, a relay switch in circuit with the push button means for controlling the supply of current to the motor, and means for automatically opening the relay switch after a chart has been brought into display position.

8. In chart display apparatus, a housing, a multiplicity of charts with means for yieldingly maintaining them in a normal position of concealment in the housing; and mechanism for moving the charts from the position of concealment for display at an opening in the front of the housing, including a rotor, individual gravity hook members on the charts, individual keepers to normally support the gravity hooks above the rotor, push button controlled electric means whereby the keepers may be independently actuated to release the hook members for engagement by the rotor, and means for automatically disconnecting the hook members from the rotor after the charts are brought to display position.

9. In chart display apparatus, a multiplicity of charts yieldingly held in a retracted position of concealment normally; means for selecting between the charts; means for holding the charts in display position; and means for moving the selected charts from the normal concealed position to display position, including an electric motor, a control switch for the motor, and means for automatically holding the switch closed until the selected charts are fully moved as aforesaid and for concurrently releasing previously displayed charts.

10. In chart display apparatus, a multiplicity of pivoted charts adapted to be selectively moved against gravity from a normal position of concealment to display position; keeper means for holding the charts in the display position and means for moving the selected charts including an electric motor, a control switch for the motor, and means for automatically holding the switch closed until the selected charts are fully moved to display position as aforesaid and for concurrently releasing previously displayed charts to return under gravity influence to their normal position of concealment.

FREDERICK GEIGER.